Nov. 22, 1966   P. JONIK   3,287,069
ROLLER FOR SUPPORTING CONVEYOR BELTS
Filed Feb. 25, 1963

# United States Patent Office 3,287,069
Patented Nov. 22, 1966

3,287,069
ROLLER FOR SUPPORTING CONVEYOR BELTS
Paul Jonik, Vocklabruck, Austria, assignor to Doubrava K.G., Attnang-Pouchheim, Austria
Filed Feb. 25, 1963, Ser. No. 260,634
2 Claims. (Cl. 308—20)

This invention relates to a roller for supporting conveyor belts, which roller comprises a shaft, two flange members made by pressing, die-casting or injection-molding and rotatably mounted on the shaft, preferably with anti-friction bearings, and a tube consisting of metal, preferably steel, which connects the flange members and forms a barrel of the roller.

The conveyor belts preferably are constituted of rubber and fabric plies or another material and serve for conveying bulk material of all kinds. The belts are supported by these rollers, the shafts of which are secured in the frame of the belt conveyor installation.

In the known rollers of this kind, machining is required on the outside of the flange members and on the inside of the end portions of the tube to obtain dimensions affording a force fit between the flange members and the tube. This has the disadvantage that an expensive machining of the components is required and that tubes having a relatively large wall thickness must be used because material is removed from the tube wall by machining. Flange members of molded thermosetting synthetic resins also require a subsequent machining because the various factors involved in molding the flange members may result in tolerances up to 0.5 mm. at the outside diameter of the flange members so that a force fit cannot be obtained. Although machining of the tubes can be avoided by the use of seamless tubes manufactured to close tolerances by drawing, these tubes are too expensive for use in the manufacture of rollers for supporting conveyor belts.

The roller according to the present invention is designed to eliminate the need for machining the flange members and the tube and simplifies the manufacture of the roller. The invention provides a roller for supporting conveyor belts, said roller comprising a shaft, two molded flange members spaced apart in the axial direction of said shaft and rotatably mounted thereon, and a roller barrel consisting of a metal tube connecting said flange members, said flange members having axially outwardly tapering, conical peripheral surfaces, said tube having an intermediate portion which has an inside diameter exceeding the largest outside diameter of said end flanges, and two axially outwardly tapering, conical end portions press-fitted on said peripheral surfaces of said flange members. This design of the roller according to the invention enables the use of a tube having a relatively small wall thickness, which results in lower cost, lighter weight and easier handling during the manufacture of the roller.

According to the invention, the peripheral surface of each flange member is slightly conically tapered in an axially outward direction and each end portion of the tube is forced against this tapered surface and is thus deformed in conformity thereto so that the roller has a slight conical taper at both ends. The flange members are suitably made in known manner from thermosettable synthetic resin and provided with ball bearings embedded in the flange members by being placed in the mould during the manufacture of the flange member, the largest diameter of the periphery of the flange members being such that said diameter can be inserted with a clearance into the tube. The flange members may have in known manner an annular extension around their end face for engagement with the end faces of the tube when the same has been forced onto the flange members. Instead of providing flange members of thermosetting plastic, any shaped body made by casting, metal die-casting or the like may be used as a flange member which according to the invention does not require machining on its outside peripheral surface.

In the roller according to the invention the tolerance of the inside diameter of the tube is of minor significance.

Two different embodiments of the invention are shown by way of example in the accompanying drawing, in which.

Figure 1:
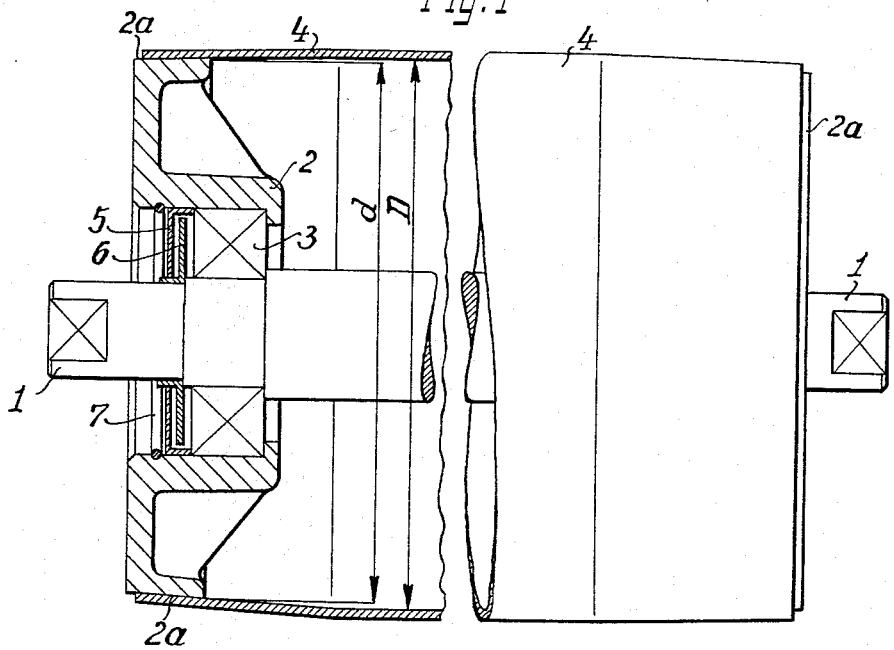
FIG. 1 shows partly in sectional view and partly in elevation a roller, from which an intermediate portion has been broken away.

FIG. 1 shows a shaft 1, two flange members 2, anti-friction bearings 3, forced into each flange member, and a roller barrel 4 consisting of a tube which connects the two flange members 2 and which supports the conveyor belt (not shown). The length of the tube corresponds to the width of the conveyor belt. Each anti-friction bearing 3 is protected against entry of dust from the outside by cover discs 5, 6, which are retained by a locking ring 7.

The tube has an internal diameter D, which exceeds the largest diameter d of the flange member 2, so that the dimensions of the tube, particularly its inside diameter, may have a running fit tolerance and the flange member can easily be inserted with a clearance into the tube. The difference between the diameters D–d may be, e.g., one to two millimetres so that even a tolerance of up to 0.5 mm. of the outside diameter of the flange members, which are molded from thermosetting plastic material, will not prevent the introduction of the flange members into the tube 4. The outside peripheral surface 2a tapers in an axially outward direction at an angle of 0.5 to 1°. After the flange members have been inserted into the end portions of the tube, the latter are deformed to the same taper and forced against the flange members so that the same are firmly bonded to the tube and form the roller. The tubes may be deformed under axial pressure by means of a die in a press. The invention enables the use of thin-walled tubes having a running fit tolerance and requiring no machining, as well as of unmachined flange members in manufacturing the roller. The conically tapered end portions of the roller do not injure the conveyor belt because there is almost no contact between the edges of the roller and the conveyor belt during the movement thereof so that the life of the belt is increased.

Figure 2:
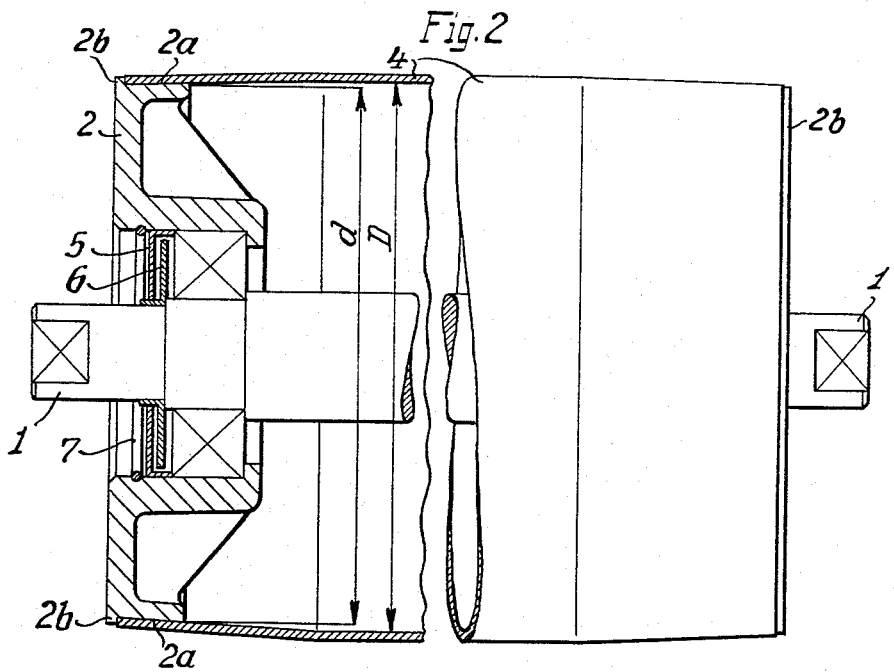
FIG. 2 is a similar view showing another embodiment of the invention.

FIG. 2 shows a modified embodiment. The flange members have at their outside peripheral surface 2a an annular extension 2b, which is engaged by the end face of the tube so that the tube will be axially located on the tapered peripheral surface in both directions.

It is obvious that the invention is not restricted to the embodiments shown by way of example. For instance, flange members of sheet metal may be used in connection with tubes having initially an inside diameter which exceeds the outerside diameter of the flange members in the manufacture of the rollers.

The process of manufacturing the roller according to the invention is much simplified by the design thereof. Because tubes may be used which are less expensive by having a smaller wall thickness and a less accurate diameter, the invention represents for the manufacture of idler rollers for conveyor belts a progress which is also of economic significance.

What is claimed is:

1. A roller for supporting conveyor belts, said roller comprising a shaft, two molded flange members spaced apart in the axial direction of said shaft and rotatably mounted thereon, said flange members being constituted of thermosetting synthetic resin material, and a roller barrel constituted by a metal tube connecting said flange members, said flange members having conical peripheral surfaces which converge outwardly towards the axis of the shaft, said tube including an intermediate portion having an inside diameter exceeding the largest outside diameter of said flange members, and two tapering conical end portions which converge outwardly towards the axis of the shaft and are press-fitted on said peripheral surfaces of said flange members.

2. A roller as claimed in claim 1, wherein said flange members include at the smaller ends of their peripheral surfaces a radially protruding rib engaging a respective adjacent end face of said tube.

References Cited by the Examiner

UNITED STATES PATENTS

| | | | |
|---|---|---|---|
| 835,456 | 11/1906 | Moore | 74—230.3 |
| 980,523 | 1/1911 | Heimer | 308—20 |
| 1,539,972 | 6/1925 | Todd | 29—116 |
| 1,660,512 | 2/1928 | Jaenicke | 308—20 X |
| 1,789,325 | 1/1931 | Strong | 74—230.3 |
| 2,046,503 | 7/1936 | Cooper | 29—148 |
| 2,429,293 | 10/1947 | Peck | 29—148.4 |
| 2,692,773 | 3/1951 | Lorig. | |
| 2,767,590 | 10/1956 | Currier | 74—230.3 |
| 2,966,065 | 12/1960 | Renner | 198—202 X |

FOREIGN PATENTS 820,881  9/1959  Great Britain.

DAVID J. WILLIAMOWSKY, *Primary Examiner.*

ROBERT C. RIORDON, *Examiner.*

R. F. HESS, *Assistant Examiner.*